United States Patent
Maksymovych

(10) Patent No.: US 9,285,279 B2
(45) Date of Patent: Mar. 15, 2016

(54) ELECTRONIC THERMOMETRY IN TUNABLE TUNNEL JUNCTION

(71) Applicant: UT-Battelle, LLC, Oak Ridge, TN (US)

(72) Inventor: Petro Maksymovych, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 386 days.

(21) Appl. No.: 13/911,914

(22) Filed: Jun. 6, 2013

(65) Prior Publication Data

US 2014/0064322 A1  Mar. 6, 2014

Related U.S. Application Data

(60) Provisional application No. 61/697,455, filed on Sep. 6, 2012.

(51) Int. Cl.
*G01K 7/00* (2006.01)
*G01K 7/01* (2006.01)
*G01K 11/00* (2006.01)

(52) U.S. Cl.
CPC . *G01K 7/01* (2013.01); *G01K 11/00* (2013.01)

(58) Field of Classification Search
USPC .............................. 374/143, 8, 208
See application file for complete search history.

(56) References Cited

U.S. PATENT DOCUMENTS

| | | | | |
|---|---|---|---|---|
| 5,331,589 A | * | 7/1994 | Gambino et al. | 369/126 |
| 5,804,709 A | * | 9/1998 | Bourgoin et al. | 73/105 |
| 6,518,872 B1 | * | 2/2003 | Edinger et al. | 338/25 |
| 7,091,476 B2 | * | 8/2006 | Kley | 250/234 |
| 7,448,798 B1 | * | 11/2008 | Wang | G01Q 60/58 374/163 |
| 2002/0110177 A1 | * | 8/2002 | Nakayama | G11B 9/14 374/44 |
| 2003/0094655 A1 | * | 5/2003 | Pekola et al. | 257/347 |
| 2008/0315092 A1 | * | 12/2008 | Kley | 250/307 |

OTHER PUBLICATIONS

A. Majumdar; "Scanning Thermal Microscopy"; 505-585; 1999; Annual Review of Materials Science 29.
B. Cretin, S. Gomes, N. Trannoy, and P. Vairac; "Scanning Thermal Microscopy"; pp. 181-238; 2007; Microscale and Nanoscale Heat Transfer, Topics App. Physics 107.
F. Menges, H. Riel, A. Stemmer, and B. Gotsmann; pp. 596-601; 2012; Nano Letters 12, ACS Publications.

(Continued)

*Primary Examiner* — Lisa Caputo
*Assistant Examiner* — Nasir U Ahmed
(74) *Attorney, Agent, or Firm* — Brinks Gilson & Lione

(57) ABSTRACT

A tunable tunnel junction thermometry circuit includes a variable width tunnel junction between a test object and a probe. The junction width is varied and a change in thermovoltage across the junction with respect to the change in distance across the junction is determined. Also, a change in biased current with respect to a change in distance across the junction is determined. A temperature gradient across the junction is determined based on a mathematical relationship between the temperature gradient, the change in thermovoltage with respect to distance and the change in biased current with respect to distance. Thermovoltage may be measured by nullifying a thermoelectric tunneling current with an applied voltage supply level. A piezoelectric actuator may modulate the probe, and thus the junction width, to vary thermovoltage and biased current across the junction. Lock-in amplifiers measure the derivatives of the thermovoltage and biased current modulated by varying junction width.

20 Claims, 3 Drawing Sheets

(56) References Cited

OTHER PUBLICATIONS

K. Kim, W. H. Jeong, W. C. Lee, and P. Reddy; "Ultra-High Vacuum Scanning Thermal Microscopy for Nanometer Resolution Quantitative Thermometry"; pp. 4248-4257; Apr. 24, 2012; ACS Nano, 6.

E. Isosaari; T. Holmqvist; M. Meschke; M. Heinonen; J.P. Pekola,; "Thermometry by Micro and Nanodevices"; pp. 323-332; 2009; Eur. Phys. J. Special Topics 172.

J. Stovneng and P. Lipaysky; "Thermopower in Scanning-Tunneling-Microscope Experiments"; pp. 9214-9216; Nov. 15, 1990; The American Physical Society, vol. 42, No. 14.

C.C. Williams and H. Wickramasinghe; "Microscopy of Chemical-Potential Variations on an Atomic Scale"; pp. 317-319; Mar. 22, 1990; Nature, vol. 344.

A. Rettenberger, C. Baur, K. Lauger, D. Hoffmann, J. Grand, and R. Moller; Variation of the Thermovoltage Across a Vacuum Tennling Barrier: Copper Islands on AG (111); pp. 1216-1219; Jul. 5, 1995; Appl. Phys. Lett. 67 (9).

J. Poler, R. Zimmermann, and E. Cox, Langmuir; "Scanning Thermopower Microscopy of Guanine Monolayers"; pp. 2689-2695; Feb. 17, 1995; American Chemical Society.

A. Schneider, M. Wenderoth, K. J. Engel, M. A. Rosentreter, A. J. Heinrich, and R. G. Ulbrich; "Local Electronic Structure at Steps on Au (111) Investigated by the Thermovoltage in Scanning Tunneling Microscopy"; pp. S161-S165; Oct. 1, 1997; Applied Physics A: Materials Science & Processing.

J. Homoth, M. Wenderoth, K. Engel, T. Druga, S. Loth, and R. Ulbrich; "Reconstruction of the Local Density of States in Ag(111) Surfaces Using Scanning Tunneling Potentiometry"; pp. 193407-1 through 193407-4; Nov. 20, 2007; Physical Review B 76, 193407.

D. Hoffmann, J. Seifritz, B. Weyers, and R. Moller; "Thermovoltage in Scanning Tunneling Microscopy"; pp. 117-125; 2000; Journal of Electron Spectroscopy and Related Phenomena 109.

S. Grafstrom; "Photoassisted Scanning Tunneling Microscopy"; pp. 1717-1753; Feb. 15, 2002; AIP Journal of Applied Physics 91.

J. Seifritz, T. Wagner, B. Weyers, and R. Moller; "Analysis of a SeC14-graphite Intercalate Surface by Thermovoltage Scanning Tunneling Microscopy"; pp. 113112-1 through 11312-3; Mar. 19, 2009; Applied Physics Letters 94.

G. Binnig, N. Garcia, H. Rohrer, J. Soler, and F. Flores; Electron-Metal-Surface Interaction Potential with Vacuum Tunneling: Observation of the Image Force; pp. 4816-4818; May 22, 1984; Physical Review B 30, No. 8.

P. Sautet and M.-L. Bocquet; Shape of Molecular Adsorbates in STM Images: A Theoretical Study of Benzene on Pt(111); pp. 4910-4925; Jun. 8, 1995; Physical Review B 53, No. 8.

A. Volokitin and B. Persson; "Near-Field Radiative Heat Transfer and Noncontact Friction"; pp. 1291-1329; Oct. 24, 2007; Reviews of Modern Physics, vol. 79.

C. R. Leavens and G. C. Aers; "Vacuum Tunnelling Thermopower: Normal Metal Electrodes"; pp. 289-295; Oct. 7, 1986; Solid State Communications vol. 61, No. 5.

J. G. Simmons; "Generalized Formula for the Electric Tunnel Effect between Similar Electrodes Separated by a Thin Insulating Film"; pp. 1793-1803; Jan. 3, 1963; Journal of Applied Physics 34.

I. Baldea and H. Koppel; "Transition Voltage Spectroscopy: A Challenge for Vacuum Tunneling Models at Nanoscale"; pp. 1-12; Jul. 18, 2011; Arxiv:1107.3501.

* cited by examiner

ELECTRONIC THERMOMETRY IN TUNABLE TUNNEL JUNCTION

CROSS REFERENCE TO RELATED APPLICATION

This application makes reference to and claims priority to U.S. Provisional Application No. 61/697,455, filed on Sep. 6, 2012, which is incorporated by reference in its entirety.

STATEMENT REGARDING FEDERALLY FUNDED RESEARCH AND DEVELOPMENT

The United States Government has rights in this invention pursuant to contract no. DE-AC05-00OR22725 between the United States Department of Energy and UT-Battelle, LLC.

BACKGROUND OF THE INVENTION

1. Technical Field

This invention relates to tunneling thermometry, and more particularly, to electronic thermometry in a tunable tunnel junction.

2. Related Art

Advanced optical methods for thermal measurements may rely on spectroscopy of infrared photons which may provide a resolution on the order of 1 micrometer. Therefore, today, many nano- and microscale temperature measurements are carried out using point-contact techniques, broadly termed Scanning Thermal Microscopy (SThM). SThM measurements rely on miniaturized thermocouples or resistive thermometers. Such measurements are typically carried out by bringing a thermal probe into a good mechanical contact and good thermal contact with a sample of interest. The temperature may be deduced from an electronic response of the thermal probe that is in turn calibrated against a known standard. Raster-scanning the probe across the surface of a heated sample material may enable mapping of local temperature variations with a resolution of approximately 50 nm.

Scanning thermal microscopy may operate with a large number of unknowns, for example, thermal resistance of the contact, temperature gradient in the junction, cooling or heating of the probed object, and the electronic and mechanical perturbation of the probed object. Thus, the measurements usually require a rigorous calibration. However, in these cases, the probe may not equilibrate with the measured object thermally while the thermal resistance itself may be dependent on measurement conditions and minute variations of a largely uncontrollable probe shape, for example, with regard to contact area and geometry. Moreover, parasitic heat loss may significantly reduce the sensitivity of the contact methods. Most of these issues are fundamental to the contact geometry, and may not be resolved by simply improving the measurement set-up or the measurement environment.

SUMMARY

Tunable tunnel junction thermometry may utilize a circuit including a first object, a second object and a variable width tunnel junction formed between the objects. The tunnel junction width may be determined based on the distance between the first object and the second object. A change in thermovoltage with respect to distance across the variable width tunnel junction may be determined based on a variation in the distance between the first object and the second object. A change in biased current crossing the variable width tunnel junction with respect to distance across the variable width tunnel junction may be measured in instances when the distance between the first object and the second object may vary. A temperature difference between the first object and the second object may be determined based on a mathematical relationship between the temperature difference, the change in thermovoltage with respect to distance across the tunnel junction and the change in biased current with respect to distance across the tunnel junction.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Measurement of a temperature gradient across a nanoscale junction may also be used to estimate or measure a temperature of a measurement lead. Rather than using a mechanical contact, a variable width tunneling electronic junction is proposed where a probe and a surface of a probed object may be separated by a small vacuum or air gap of approximately 1 nm. This separation may increase heat-resistance across the junction and may prevent the system from reaching thermal equilibrium. Although an unequilibrated junction may be a problem for contact thermal microscopy, it may be considered an advantage in a non-contact approach, such as the present approach, which may become more accurate in the case of an infinite thermal resistance. A tunneling junction may preclude physical perturbation and may reduce electronic perturbation of the measured object.

The disclosed thermometry method may relate a temperature gradient across a nanoscale junction to measured derivatives of voltage and current and a number of fundamental constants. The temperature gradient may be determined without sensor calibration as a function of temperature. The temperature gradient may be measured and may apply to tunnel junctions outside of thermal equilibrium, as those found in scanning thermal microscopy, thermoelectric energy harvesting, solid state cooling devices and other related technologies.

The present technique does not require cryogenic temperatures. It may operate in an atomic-scale junction of a tunneling microscope at up to 350 K and does not have a fundamental limitation to extend beyond this temperature.

Figure 1:
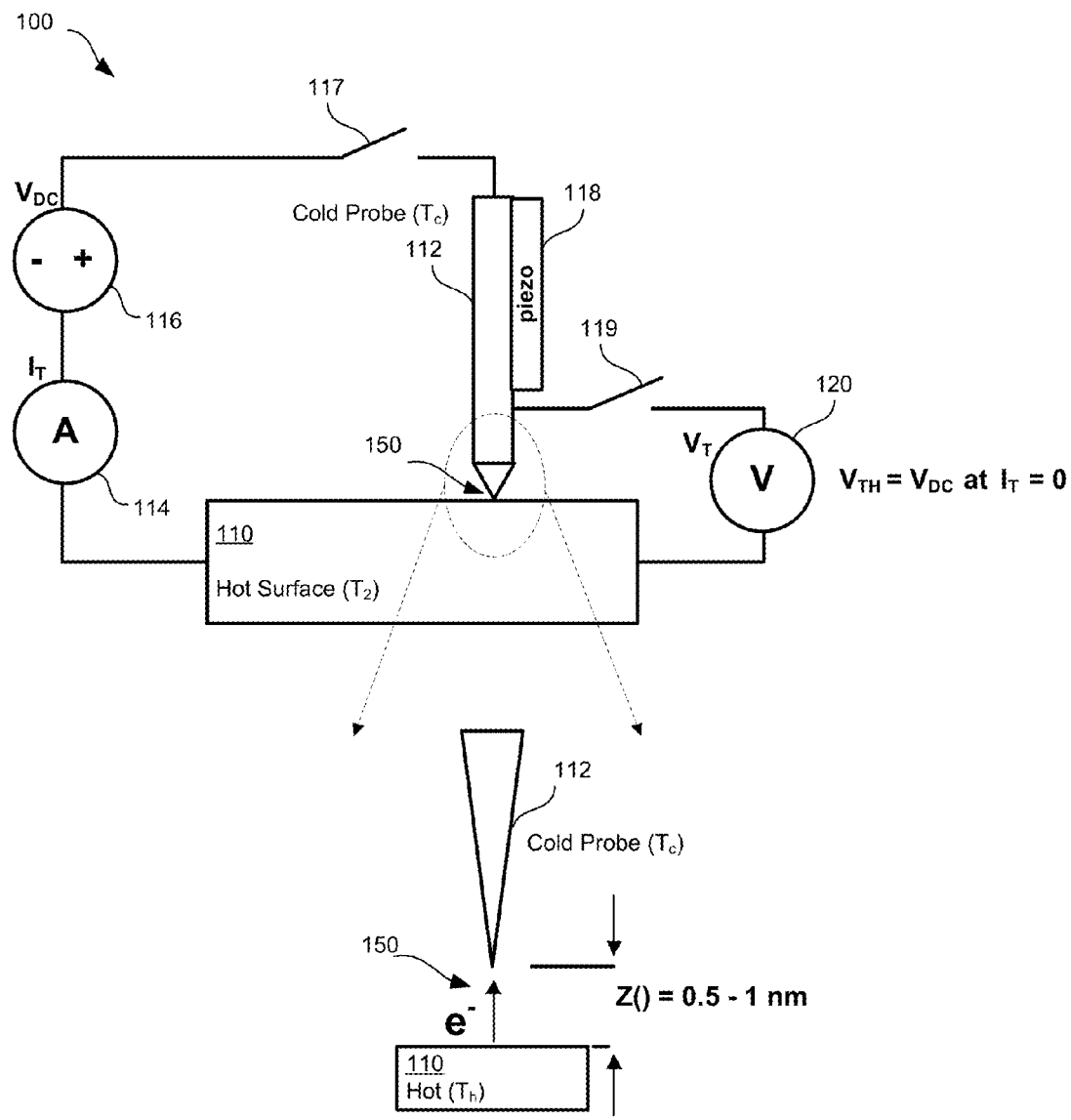
FIG. 1 is an electronic thermometry system for determining temperature difference across a tunable electron tunnel junction between a subject material and a probe where the temperature difference may be estimated based on a change of tunneling thermovoltage with respect to distance, across the tunable tunnel junction

FIG. 1 is an electronic thermometry system for determining temperature difference across a tunable electron tunnel junction between a subject material and a probe where the temperature difference may be estimated based on a change of tunneling thermovoltage with respect to distance, across the tunable tunnel junction. Referring to FIG. 1, there is shown a system 100 comprising a circuit including a test subject 110, a probe 112, an amp meter 114, a voltmeter 120, a direct current voltage source ($V_{DC}$) 116, two switches 117 and 119 and a piezoelectric actuator 118. Between the test subject 110 and the probe 112 there may be a gap comprising a tunable electron tunnel junction 150. The tunable electron tunnel junction 150 may be referred to herein as a tunable tunnel junction, a tunnel junction, a variable width tunnel junction, or the junction 150, for example.

The probe 112 may comprise a measurement lead, for example, a sharp metal tip or a wire. The test subject 110 may be an object, for example, with a relatively flat surface made of metallic or semiconductor material. The probe 112 may be positioned near the test subject 110 such that a nanoscale tunnel junction 150 is established between the probe and test subject. The distance between the probe 112 and the test subject 110 may be adjustable by the piezoelectric actuator 118 or by other means such as a mechanical or magnetic actuator. However, the system is not limited with regard to any specific technique for adjusting the distance between the probe 112 and the test subject 110 and any suitable technique may be utilized. The probe 112 and the test subject 110 may be referred to as electrodes.

In some systems, the temperature of either or both of the probe 112 and the test subject 110 may be controlled. For example, the test subject 110 may be heated or its temperature may vary based on conditions in its environment. In some exemplary systems, the test subject 110 may be heated by a laser or a heater. In some systems, physical operating conditions or biochemical processes may vary the temperature of the test subject 110. However, the system is not limited with regard to how the test subject 110 is heated and any suitable method or condition may be utilized. Similarly, the temperature of the probe 112 may be controlled by any suitable method. In some systems the probe 112 may be held at a reference temperature by a heat bath. For example, the probe 112 may be held at room temperature while the test subject 110 may be heated with a heater. Although FIG. 1 shows the test subject 110 as a hot surface and the probe 112 as cold, the temperature of the probe 112 may be higher or lower than the test subject 110. When a temperature gradient occurs across the tunnel junction 150, it may produce a thermovoltage or thermoelectric current signal across the tunnel junction 150.

The tunable electron tunnel junction 150 may act as a sensor for temperature measurements and may have a variable or tunable width (z) in a gap spanning the from the test subject 110 to the probe 112. The size of the tunnel junction 150 parallel to the surface and/or parallel to the gap may be as small as an atomic dimension, (for example, as in molecular break junctions, nanocapacitors and scanning tunneling microscopy) or may be up to several micrometers wide (for example, as in integrated circuits, transistors and macroscopic tunnel junctions). Thus, lateral spatial resolution, down to at least 1 nm or better may be achieved in raster scanned temperature measurements across the surface of the test material 112 using the present technique. Further, the width (z) of the tunable tunnel junction 150, from the probe 112 to the surface of the test subject 110, may be adjustable or tunable by the piezoelectric actuator 118.

The amp meter 114 may be connected in series with the probe 112, the tunable tunnel junction 150, the switch 117 and the test subject 110. In instances when the switch 117 is closed, the amp meter 114 may measure the current crossing the junction 150. Also, in instances when the switch 117 is closed, the voltage source 116 may supply a DC voltage across the tunnel junction 150. In instances when the switch 119 is closed, the voltmeter 120 may measure the voltage across the tunable tunnel junction 150. For example, in instances when the switch 119 is closed and the switch 117 is open, voltmeter 120 may measure a thermal voltage across the tunable tunnel junction 150.

The system 100 may comprise a tunnel junction 150 of a scanning tunneling microscope, formed between a cold metal tip 112 and a hot metal (or semiconductor) surface 110. Based on the adjustable distance between the test subject 110 and the probe 112, distance dependent tunneling thermovoltages across the junction 150 may be acquired by adjusting the junction 150 width (z) using the piezoelectric actuator 118 and nullifying the thermocurrent measured by the amp meter 114 by adjusting the DC power supply $V_{DC}$ 116. The value of the nullifying voltage applied across the junction 150 by $V_{DC}$ 116 may indicate or be equivalent to the thermovoltage ($V_{TH}$) across the tunnel junction 150. Also, at various distances (z) across the tunnel junction 150, a tunneling current $I_T$ may be measured with a fixed applied voltage ($V_{DC}$), which significantly exceeds $V_{TH}$ (for example, an applied $V_{DC}$ of 3×Vth or 5×Vth, but not limited to these values).

In operation of the system 100, the tunable electron tunnel junction 150 may be formed between the test subject 110 for which a temperature is to be measured and a single measurement lead or probe 112. The distance between test subject 110 and the probe 112 may be adjustable by the piezoelectric actuator 118. A temperature gradient may be induced across the tunable tunnel junction 150 or may already be present. A voltage may be measured across the tunnel junction 150 to determine thermovoltage $V_{TH}$ with the voltmeter 120 (for example, with switch 119 closed and switch 117 open). Alternatively, the thermovoltage across the junction 150 may be determined by nullifying a thermoelectric tunneling current (at zero applied bias) with the voltage power supply 116 where the value of the nullifying voltage indicates or is equivalent to the thermovoltage. The distance (z) between the probe 112 and the test subject 110 may be varied and the thermovoltage measurements may be repeated as a function of the distance (z) between the electrodes 110 and 112. Also, tunneling current ($I_T$) measurements may be taken as a function of the distance between the probe 112 and the test subject 110. In this regard, a DC bias voltage that exceeds the thermovoltage (for example, a DC bias voltage of 3×Vth or 5×Vth, but not limited to these values) may be applied by the $V_{DC}$ source 116 and DC current may be measured by the amp meter 114 with the DC voltage bias applied. DC current measurements may be repeated as the distance between the electrodes is varied. The temperature difference between the probe 112 and the test subject 110 may be determined by applying a mathematical formula (eq. 2 and 3 below) to values extracted from the measured distance dependent thermovoltage and the measured distance dependent tunneling current. For example, the change in thermovoltage with respect to the change in distance (z) across the tunnel junction 150 may be determined and the change in biased current with respect to the change in distance (z) across the tunnel junction 150 may be determined.

Any suitable protocol may be utilized for measuring the distance-dependence of the thermovoltage and distance dependence of the tunneling current. For example, a mechanical contraction of the tunnel junction 150 may be initiated by the piezoelectric actuator 118. While the tunnel junction 150 is contracting thermovoltage may be measured continuously. Once a specified value for the junction contraction is reached, the DC voltage may be applied with a magnitude exceeding the thermovoltage (for example, a DC voltage of 3×Vth or 3×Vth, but not limited to these values). A reverse motion of the junction contraction may expand the tunnel junction 150 along the z axis and the DC current may be measured continuously by the amp meter 114, while the junction 150 is expanding.

In accordance with another aspect of the present system, instead of using the thermovoltage measurements and measuring the thermovoltage as a function of the distance (z) between the electrodes 110 and 112, thermovoltage may be replaced with a thermoelectric current signal measured at zero applied DC bias by the amp meter 114, and current measurements as a function of the distance between the probe 112 and the test subject 110 may be taken. The thermocurrent signal may be converted into thermovoltage by $V_{th}(z) = I_{th}(z)*R(z)$, where R(z) is the resistance of the junction as a function of its width. R(z) may be obtained from the distance-dependent current measurement at a fixed DC bias as $R(z) = V_{DC}/I(z)$, where $V_{DC}$ is the value of the DC voltage bias which exceeds thermovoltage (for example, a $V_{DC}$ of 3×Vth or 5×Vth, but not limited to these values).

Figure 2:
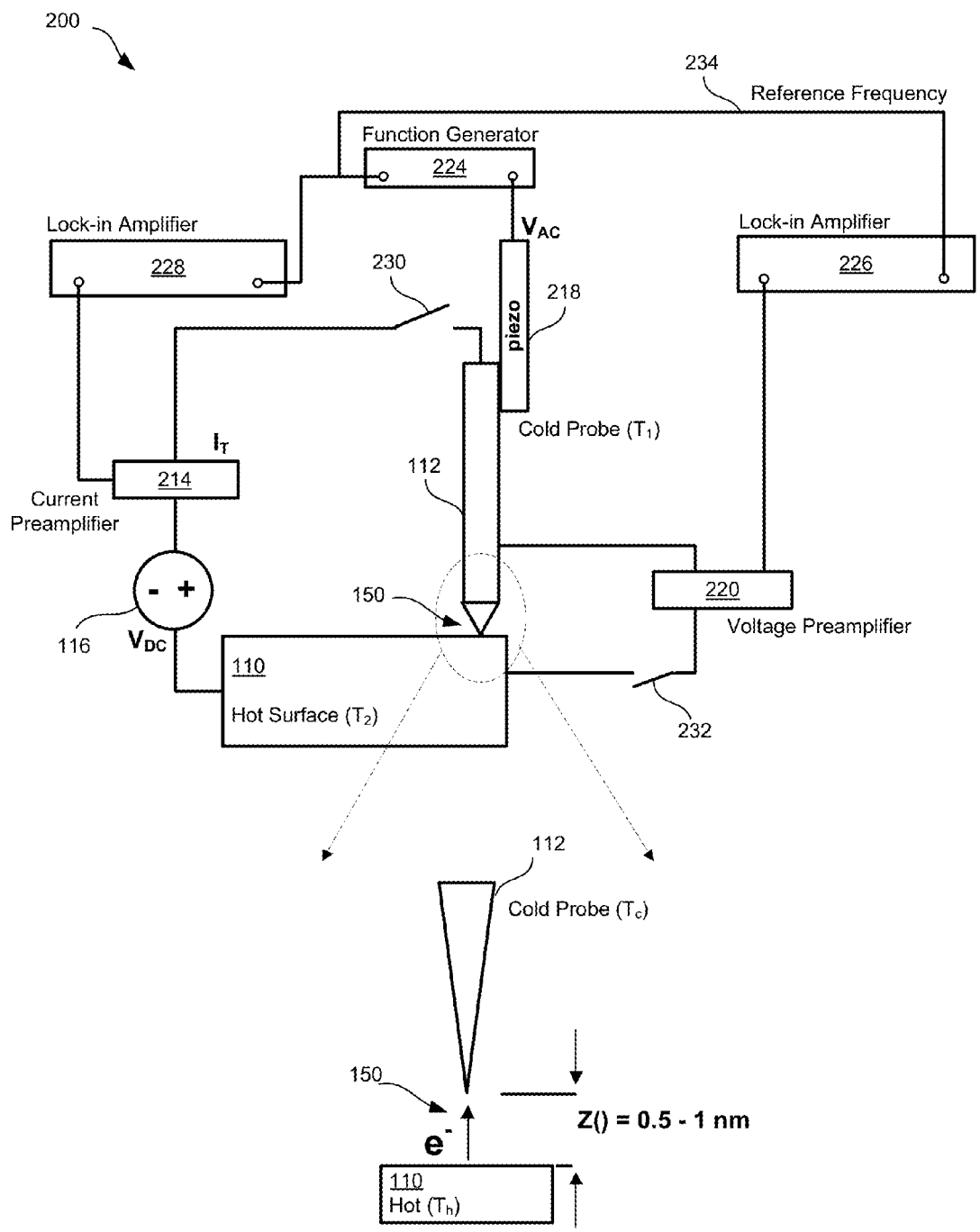
FIG. 2 is a diagram of an automated electronic thermometry system for determining temperature difference across a tunable electron tunnel junction, which may be estimated based on a change of tunneling thermovoltage with respect to a modulated distance, across the tunable tunnel junction.

FIG. 2 is a diagram of an electronic thermometry system for determining temperature difference across a tunable electron tunnel junction between a subject material and a probe, where the temperature difference may be estimated based on the change of tunneling thermovoltage with respect to a change in modulated distance, across the tunable tunnel junction. Referring to FIG. 2, there is shown a system 200 comprising a circuit including the test subject 110, the probe 112 and the DC voltage source 116. Between the test subject 110 and the probe 112 there may be a gap comprising the tunable electron tunnel junction 150. The test subject 110, the probe 112, the DC voltage source 116 and the tunable electron tunnel junction 150 are described with respect to FIG. 1.

The circuit shown in system 200 also includes the current pre-amplifier 224, the lock-in amplifier 228, the function generator 224, the piezoelectric actuator 218, the voltage pre-amplifier 220, the lock-in amplifier 226, the switch 230, the switch 232 and the reference frequency connection 234.

The function generator 224 may be operable to supply an alternating voltage $V_{AC}$ to the piezoelectric actuator 218 which may oscillate the probe 112 such that the width (z) of the tunnel junction 150 may vary over time. Variations in the width of the tunnel junction may vary the resistance R(z) of the tunnel junction 150. In addition, the function generator 224 may provide a reference frequency 234 to the lock-in amplifiers 226 and 228.

In instances when the switch 232 is closed, the voltage preamplifier 220 may amplify voltage including thermovoltage across the tunnel junction. The lock-in amplifier may receive the pre-amplified voltage signal and may measure and filter a derivative of the pre-amplified voltage signal.

In instances when the switch 230 is closed, the current pre-amplifier 214 may amplify the tunnel current crossing the tunnel junction 150. The lock-in amplifier 228 may be operable to measure and filter the distance-derivative of the pre-amplified tunnel current. The tunnel current may include a thermoelectric current crossing the tunnel junction 150 and/or may include a bias current component in instances when the voltage source 116 applies a DC voltage across the tunnel junction 150. Although, the lock-in amplifier 228 is shown in FIG. 2 and utilized to measure and filter the distance derivative, other similar methods and/or instruments may be utilized for determining the distance derivative and/or harmonics of current or voltage signals, for example.

An alternating voltage signal ($V_{AC}$) output from the function generator 218 may be applied to the piezoelectric actuator 218 to modulate the width of the tunneling junction 150 gap at a fixed frequency. In instances when the switch 230 may be closed, the switch 232 may be open and a fixed DC bias may be applied by the voltage source 116 across the tunable tunnel junction 150, a first harmonic of a pre-amplified tunneling current crossing the junction 150, may be recorded by the lock-in amplifier 228, where the lock-in amplifier 228 may be synchronized with the function generator 224. In instances when the switch 230 may be open and the switch 232 may be closed, a first harmonic of a pre-amplified thermovoltage signal across the tunable tunnel junction 150 may be recorded by the lock-in amplifier 226. The first harmonic signal of the lock-in-amplifier 226 may be equivalent to proportional to the derivative of the thermovoltage with respect to distance $$\frac{dV_{th}}{dz}$$

where z is the width of the tunnel junction 150 determined by the distance from the test subject 110 and the probe 112.

In operation of the system 200, a tunable electron tunnel junction may be formed between the test subject 110 and the probe 112. The distance (z) between the test subject 110 and probe 112 may be adjustable by a piezoelectric, mechanical or magnetic actuator 218, for example. A periodic modulation of the junction 150 width (z) may be induced with a specified frequency, for example, a frequency in the range of 200 Hz to 1 kHz, however, the system is not limited with regard to any specific frequency or range of frequencies. With the switch 232 closed and switch 230 open, a first harmonic of a thermovoltage signal, modulated by the changing junction width (z) as $$\frac{dV_{th}}{dz},$$

may be measured with the lock-in amplifier 226. With switch 230 closed and switch 232 open, and with a fixed $V_{DC}$ from the voltage source 116, of magnitude at least three to five times the measured thermovoltage across the tunable tunnel junction 150, the first harmonic of the current signal may be measured with lock-in amplifier 228. The first harmonic of the current signal may be divided by an average DC current at a selected DC voltage supplied by $V_{DC}$ 116, to obtain $$\left(\frac{d\ln I}{dz}\right)^2.$$

Subsequently the formula $$\varphi(eV) = -0.952\left(\frac{d\ln I}{dz(A)}\right)^2$$

may be applied to obtain the tunneling barrier height φ(eV), where eV are electron volts and A is Angstroms. The determined values of $$\frac{dV_{th}}{dz}$$

and φ(eV) may be applied in Eq. (2) and (3) below to obtain the temperature gradient.

In instances when a temperature gradient exists across a metal-insulator-metal tunnel junction, the Fermi-Dirac distribution of its leads may be out of equilibrium, giving rise to electron current at zero applied bias. The magnitude of applied bias that nullifies thermoelectric current may be termed the tunneling thermovoltage. In Eq. 1, an interpretation of tunneling thermovoltage measurements using the Tersoff-Hamann approximation for a junction out of thermal equilibrium may be used to derive a formula for the thermovoltage in terms of the temperature difference between a tip ($T_t$) and a surface ($T_S$), respective derivatives for the density of states (DOS, ρ) and the tunneling barrier height (φ).

$$V_{th} = \frac{\pi^2 k_B^2 (T_t^2 - T_s^2)}{6e} \left[ \frac{1}{\rho_s} \frac{d\rho_s}{d\varepsilon} + \frac{1}{\rho_t} \frac{d\rho_t}{d\varepsilon} + \frac{z}{\hbar} \sqrt{\frac{2m_0}{\varphi}} \right]_{E_F} \quad \text{(Eq. 1)}$$

Where $m_0$ is free-electron mass, $k_B$ is the Boltzmann constant, e is electron charge, ℏ is Planck's constant. The distance (z) dependent third term of Eq. 1 may stem from the exponential decay of electronic state in a vacuum and may be considered a universal property of any tunnel junction. Eq. 1 (as well as its more general form before application of the Wentzel-Kramers-Brillouin (WKB) approximation for distance-dependence of a tunneling process) may reveal that the distance-dependence of tunneling thermovoltage can be used to estimate a temperature gradient in a tunneling junction. Indeed, if φ is independently determined from current-distance spectroscopy, and $m_0$ is considered to be free electron mass, then the temperature differences may be approximated as:

$$(T_t^2 - T_s^2) = \frac{3\hbar e}{\pi^2 k_B^2 \sqrt{2m_0}} \sqrt{\varphi} \frac{dV_{th}}{dz} \quad \text{(Eq. 2)}$$

$$\Delta T \approx \frac{3\hbar e}{\pi^2 k_B^2 \sqrt{2m_0}} \frac{\sqrt{\varphi}}{2\overline{T}} \frac{dV_{th}}{dz} \quad \text{(Eq. 3)}$$

Where Eq. (3) is valid for small temperature differences when $\Delta T \ll T_s \approx T_t$ and $\overline{T}$ is the mean temperature between the tip and the surface. This equation may be valid for any tunnel junction, not only between a tip and a surface, but also for planar junctions, cross junctions and any other type of a tunnel junction. If the temperature of one of the leads of the tunnel junction is known (from a macroscopic measurement), the temperature of the other lead may also be determined from Eq. (3). For a tunable tunnel junction, where the distance between the electrodes may be systematically varied, the tunneling barrier height φ may be directly calculated from the exponential distance-dependence of the tunneling current at a fixed DC voltage, as $$\varphi(eV) = -0.952 \left( \frac{d \ln I}{dz(A)} \right)^2.$$

Also, $$\frac{dV_{th}}{dz}$$

may be directly measurable in a tunable tunnel junction 150 as the slope of the distance-dependence of the thermovoltage which is directly measurable in the tunable tunnel junction 150. The rest of the terms in Eq. (2) and Eq. (3) are fundamental constants ($k_B$—Boltzmann constant, e—electron charge, ℏ—Planck's constant) and the only additional assumption may be that of a free-electron tunneling mass, which may hold for most tunnel junctions, particularly those with metal electrodes. Thermal gradient may then be estimated without an explicit temperature calibration of the tunneling thermovoltage, and random electronic changes in the tunnel junction 150 may be accounted for by the tunneling barrier height.

Figure 3:
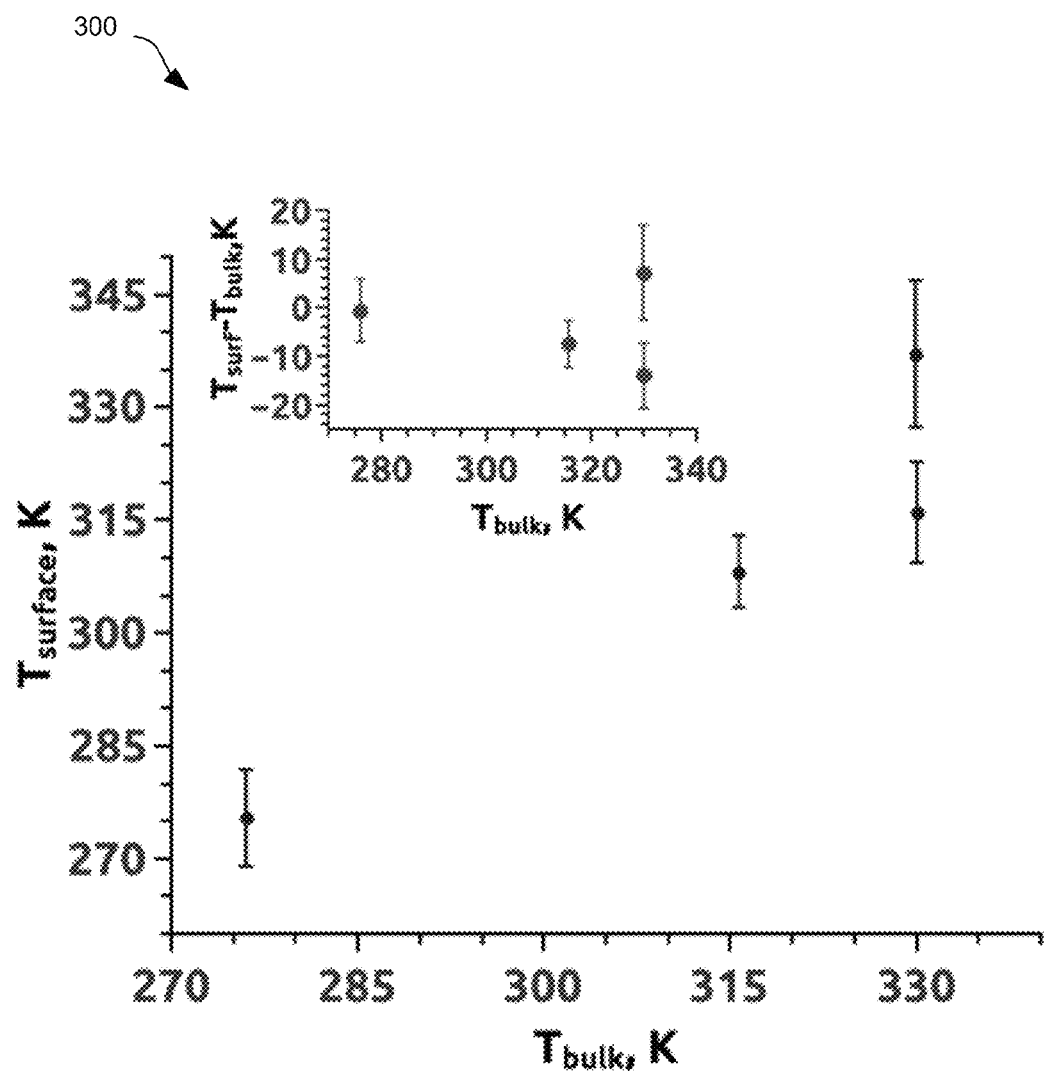
FIG. 3 is a graph set showing local temperature of a surface in a tip-surface tunnel junction which may be calculated using synchronously acquired distance-dependence data of tunneling current and tunneling thermovoltage.

FIG. 3 is a graph set showing local temperature of the surface ($T_{surface}$) of the test subject 110 in the tip-surface junction 150 which may be calculated using Eq. (2) and using synchronously acquired distance-dependence data on tunneling current and tunneling thermovoltage. Each point may correspond to an average of five to ten individual measurements acquired at random locations over the surface of the test subject 110. $T_{bulk}$ is a macroscopic temperature measurement of the test subject 110 and may include a temperature read-out of a silicon diode located in close proximity (but not in direct contact) of a sample holder of the test subject 110. The inset in FIG. 3, shows the difference between calculated local temperatures and measured macroscopic temperature readings as a function of the macroscopic temperature reading $T_{bulk}$.

The methods described hereinabove may utilize a custom-modified variable temperature scanning tunneling microscope with specific provisions to decrease noise in the current measurement down to <40 fA at 1 kHz bandwidth. A clean Ag(111) surface may be prepared using standard procedures of Ar⁺ sputtering and post-annealing to 700 K in ultra-high vacuum. The temperature gradient across the tip-surface junction may be established by heating the sample surface by 10-30 K relative to the temperature of the tip (which may be assumed to be at 294 K).

FIG. 3 shows the temperature of a surface ($T_s$) calculated using Eq. (2) from a series of simultaneous distance-dependent thermovoltage and current data versus a macroscopic sample temperature measured using a thermocouple in close proximity of the sample holder. The data was acquired on four different days and four different temperature set-points (two of which were very close). The macroscopically and nanoscopically measured temperatures of the surface are similar in magnitude as shown in FIG. 3, though the nanoscopic temperature differences tend to be smaller. This may not be unexpected given inaccuracies of macroscopic temperature measurements, as well as a finite thermal conductance of the tunnel junction 150, which may reduce the local temperature gradient compared to an ideally thermally insulating case. Moreover, a relatively large drift in the set-up may affect the accuracy of the measurement. However, the presently observed correlation in FIG. 3 may confirm the feasibility of a direct measurement of thermal gradients possible in tunable tunneling contacts. Since scanning probe microscopy and scanning tunneling microscopy may achieve sub-1 nm spatial resolution due to highly localized electronic currents, a similar resolution may be achievable in the temperature gradient measurement disclosed herein, because it derives from highly localized currents.

While various embodiments of the system have been described, it will be apparent to those of ordinary skill in the art that many more embodiments and implementations are possible within the scope of the invention. Accordingly, the invention is not to be restricted except in light of the attached claims and their equivalents.

I claim:

1. A method of variable width tunnel junction thermometry, the method comprising:
   in a circuit including a first object comprising a conductor, a second object comprising a conductive test subject and a tunnel junction formed in a nanoscale gap spanning a distance from the first object to the second object, wherein the distance across the tunnel junction from the first object to the second object is varied by varying a position of the first object or the second object:
   determining a change in thermovoltage across the tunnel junction with respect to a change in the distance across the tunnel junction from the first object to the second object by taking measurements while varying the distance across the tunnel junction from the first object to the second object;
   determining a change in biased current crossing the tunnel junction with respect to a change in the distance across the tunnel junction by taking measurements while varying the distance from the first object to the second object; and
   determining a temperature difference between the first object and the second object based on a relationship between the temperature difference, the change in thermovoltage across the tunnel junction with respect to the change in distance across the tunnel junction and the change in biased current crossing the tunnel junction with respect to the change in distance across tunnel junction.

2. The method of claim 1 wherein a thermal gradient is induced across the tunnel junction.

3. The method of claim 1, wherein the determining the change in thermovoltage across the tunnel junction with respect to the change in distance across the tunnel junction further comprises:
   measuring thermovoltage across the tunnel junction, wherein the measuring utilizes one or both of:
   a voltmeter across the tunnel junction, and
   a voltage supply level wherein the voltage supply level nullifies an unbiased thermoelectric tunneling current in instances when the voltage supply is applied across the tunnel junction; and
   repeating the thermovoltage measurement as the distance from the first object to the second object varies.

4. The method of claim 1, wherein the determining change in biased current crossing the tunnel junction with respect to the change in distance across the tunnel junction further comprises:
   applying a DC bias voltage across the tunnel junction that exceeds a thermovoltage measured across the tunnel junction by at least a factor of three through five;
   measuring DC current crossing the tunnel junction; and
   repeating the DC current measurement as the distance from the first object to the second object varies.

5. The method of claim 1 wherein the distance between the first object and the second object is adjustable by a piezoelectric actuator, a mechanical actuator or magnetic actuator.

6. The method of claim 1, wherein the determining the change in thermovoltage across the tunnel junction with respect to the change in the distance across the tunnel junction and the determining the change in biased current crossing the tunnel junction with respect to a change in the distance across the tunnel junction further comprises:
   initiating a mechanical contraction of the tunnel junction by an actuator;
   while the tunnel junction is contracting, measuring thermovoltage continuously across the tunnel junction until a specified tunnel junction width is reached;
   applying a DC bias across the tunnel junction;
   initiating a mechanical expansion of the tunnel junction by the actuator; and
   while the tunnel junction is expanding, measuring DC biased current continuously across the tunnel junction until a specified tunnel junction width is reached.

7. The method of claim 1 further comprising, inducing a periodic modulation of the distance across the tunnel junction at a specified frequency.

8. The method of claim 7 further comprising, determining the change in thermovoltage across the tunnel junction with respect to the change in distance across the tunnel junction by measuring a first harmonic of a thermovoltage signal which is modulated by the periodic modulation of distance across the tunnel junction.

9. The method of claim 8 further comprising, determining the change in biased current crossing the tunnel junction with respect to the change in distance across the tunnel junction by measuring a first harmonic of a biased current signal which is modulated by the periodic modulation of the distance across the tunnel junction.

10. The method of claim 9 further comprising, determining a tunnel junction barrier energy based on the first harmonic of the biased current signal, to determine the temperature difference between the first object and the second object based on the relationship between the temperature difference, the change in thermovoltage across the tunnel junction with respect to the change in distance across the tunnel junction and the change in biased current crossing the tunnel junction with respect to the change in distance across the tunnel junction.

11. A system for variable width tunnel junction thermometry comprising:
    one or more circuits, said one or more circuits comprising:
    a first object comprising a conductor and a second object comprising a conductive test subject and a tunnel junction formed in a nanoscale gap spanning a distance between the first object and the second object wherein the distance across the tunnel junction from the first object to the second object is varied by varying a position of the first object or the second object,
    wherein said one or more circuits are operable to:
    determine a change in thermovoltage across the tunnel junction with respect to a change in the distance across the tunnel junction from the first object to the second object by taking measurements while varying the distance across the tunnel junction from the first object to the second object;
    determine a change in biased current crossing the tunnel junction with respect to a change in the distance across the tunnel junction by taking measurements while varying the distance from the first object to the second object; and determine a temperature difference between the first object and the second object based on a relationship between the temperature difference, the change in thermovoltage across the tunnel junction with respect to the change in distance across the tunnel junction and the change in biased current crossing the tunnel junction with respect to the change in distance across the tunnel junction.

12. The system of claim 11 wherein a thermal gradient is induced across the tunnel junction.

13. The system of claim 11 wherein the determining the change in thermovoltage across the tunnel junction with respect to the change in distance across the tunnel junction further comprises:
   measuring thermovoltage across the tunnel junction with one or both of:
      a voltmeter across the tunnel junction, and
      a voltage supply level wherein the voltage supply level nullifies an unbiased thermoelectric tunneling current in instances when the voltage supply is applied across the tunnel junction; and
   repeating the thermovoltage measurement as the distance from the first object to the second object varies.

14. The system of claim 11 wherein the determining the change in biased current crossing the tunnel junction with respect to the change in distance across the tunnel junction further comprises:
   applying a DC bias voltage across the tunnel junction that exceeds a thermovoltage measured across the tunnel junction by at least a factor of three through five;
   measuring DC current crossing the tunnel junction; and
   repeating the DC current measurement as the distance from the first object to the second object varies.

15. The system of claim 11 wherein the distance between the first object and the second object is adjustable by a piezoelectric actuator, a mechanical actuator or magnetic actuator.

16. The system of claim 11 wherein the determining the change in thermovoltage across the tunnel junction with respect to the change in the distance across the tunnel junction and the determining the change in biased current crossing the tunnel junction with respect to the change in the distance across the tunnel junction further comprises:
   initiating a mechanical contraction of the tunnel junction by an actuator;
   while the tunnel junction is contracting, measuring thermovoltage continuously across the tunnel junction until a specified tunnel junction width is reached;
   applying a DC bias across the tunnel junction;
   initiating a mechanical expansion of the tunnel junction by the actuator; and
   while the tunnel junction is expanding, measuring DC biased current continuously across the tunnel junction until a specified tunnel junction width is reached.

17. The system of claim 11 wherein said one or more circuits are operable to induce a periodic modulation of the distance across the tunnel junction at a specified frequency.

18. The system of claim 17 wherein said one or more circuits are operable to determine the change in thermovoltage across the tunnel junction with respect to the change in distance across the tunnel junction by measuring a first harmonic of a thermovoltage signal which is modulated by the periodic modulation of the distance across the tunnel junction.

19. The system of claim 18 wherein said one or more circuits are operable to determine the change in biased current crossing the tunnel junction with respect to the change in distance across the tunnel junction by measuring a first harmonic of a biased current signal which is modulated by the periodic modulation of the distance across the tunnel junction.

20. The system of claim 19 wherein said one or more circuits are operable to determine a tunnel junction barrier energy based on the first harmonic of the biased current, to determine the temperature difference between the first object and the second object based on the relationship between the temperature difference, the change in thermovoltage across the tunnel junction with respect to the change in distance across the tunnel junction and the change in biased current crossing the tunnel junction with respect to the change in distance across the tunnel junction.

* * * * *